(12) United States Patent
Isobe (10) Patent No.: US 11,396,075 B2
(45) Date of Patent: Jul. 26, 2022

(54) METHOD OF DETECTING ORIGIN POINT OF MACHINE TOOL AND TOOL MAGAZINE

(71) Applicant: FANUC CORPORATION, Yamanashi (JP)

(72) Inventor: Gaku Isobe, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 38 days.

(21) Appl. No.: 16/684,272

(22) Filed: Nov. 14, 2019

(65) Prior Publication Data
US 2020/0206860 A1 Jul. 2, 2020

(30) Foreign Application Priority Data
Dec. 26, 2018 (JP) .............................. JP2018-242462

(51) Int. Cl.
*B23Q 3/157* (2006.01)
*B23Q 17/00* (2006.01)
(Continued)

(52) U.S. Cl.
CPC ......... *B23Q 16/02* (2013.01); *B23Q 3/15534* (2016.11); *B23Q 3/15722* (2016.11);
(Continued)

(58) Field of Classification Search
CPC . B23Q 3/15534; B23Q 3/155–3/15793; B23Q 17/22–17/2495; B23Q 15/26; B23Q 3/15722; B23Q 2039/004; B23Q 2003/15586; B23Q 2220/002; B23Q 16/02–16/12; Y10T 483/13; Y10T 483/1882; Y10T 29/5152–5167; Y10T 74/1412–1502; Y10T 82/2506–2508; Y10T 82/2587; Y10T 408/37;
(Continued)

(56) References Cited

U.S. PATENT DOCUMENTS

| | | | |
|---|---|---|---|
| 2012/0220437 A1* | 8/2012 | Hayashi | B23Q 3/15722 483/30 |
| 2013/0331245 A1 | 12/2013 | Koike et al. | |
| 2019/0009382 A1 | 1/2019 | Inaguchi et al. | |

FOREIGN PATENT DOCUMENTS

| | | |
|---|---|---|
| DE | 2609337 A1 | 9/1977 |
| EP | 2679338 A1 | 1/2014 |

(Continued)

OTHER PUBLICATIONS

Machine Translation of JP 60-044248 A, which JP '248 was published Mar. 1985.*

(Continued)

*Primary Examiner* — Erica E Cadugan
(74) *Attorney, Agent, or Firm* — Karceski IP Law, PLLC (57) ABSTRACT

A machine tool includes a tool magazine configured to hold a plurality of tools, the tool magazine having a rotary unit rotatable around a predetermined rotary axis and a measured portion provided in the rotary unit, a sensor disposed outside of the rotary unit in a radial direction that is perpendicular to the rotary axis, and configured to detect the measured portion, and a controller configured to detect a position of an origin point of the rotary unit based on a result of the detection by the sensor.

7 Claims, 7 Drawing Sheets

(51) Int. Cl.
*B23Q 16/02* (2006.01)
*B23Q 3/155* (2006.01)
*B23Q 17/24* (2006.01)

(52) U.S. Cl.
CPC ........ *Y10T 483/13* (2015.01); *Y10T 483/1795* (2015.01); *Y10T 483/1882* (2015.01)

(58) Field of Classification Search
CPC ........ B23B 3/16–168; B23B 29/24–34; B23B 39/20–205; G01B 11/00; G01B 11/002; G01B 11/026; G01B 11/03; G01B 11/14; G01B 11/2755; G01P 13/04; G01P 13/045
USPC ............ 483/7, 67; 29/35.5–48.5 A; 74/813 R–813 L; 82/120–122, 159; 408/35; 356/614–615, 620, 622; 250/559.29–559.39, 559.44
See application file for complete search history.

(56) References Cited

FOREIGN PATENT DOCUMENTS

| | | | |
|---|---|---|---|
| JP | S5187479 U | 7/1976 | |
| JP | 55622983 Y | 5/1981 | |
| JP | 60-044248 A | * 3/1985 | |
| JP | 5628049 U | 1/1987 | |
| JP | S63154145 U | 10/1988 | |
| JP | H0467946 U | 6/1992 | |
| JP | H0549307 U | 6/1993 | |
| JP | 05-251546 A | * 9/1993 | |
| JP | H0743134 A | 2/1995 | |
| JP | 07-324945 A | * 12/1995 | |
| JP | 2513682 Y | 10/1996 | |
| JP | H10277817 A | 10/1998 | |
| JP | H10321707 A | 12/1998 | |
| JP | H10340940 A | 12/1998 | |
| JP | H11145259 A | 5/1999 | |
| JP | 2000223551 A | 8/2000 | |
| JP | 2001291630 A | 10/2001 | |
| JP | 2003334742 A | 11/2003 | |
| JP | 2005313254 A | 11/2005 | |
| JP | 2015008700 A | 1/2015 | |
| JP | 2015155842 A | 8/2015 | |
| JP | 2019014005 A | 1/2019 | |
| WO | 2012114533 A1 | 8/2012 | |

OTHER PUBLICATIONS

Machine Translation JP 07-324945-A, which JP '945 was published Dec. 1995.*
Japanese Notice of Reasons for Refusal dated Apr. 20, 2021, for Japanese Patent Application No. 2018242462.
Japanese Search Report by Registered Search Organization dated Feb. 26, 2021, for Japanese Patent Application No. 2018242462.

* cited by examiner

METHOD OF DETECTING ORIGIN POINT OF MACHINE TOOL AND TOOL MAGAZINE

CROSS-REFERENCE TO RELATED APPLICATIONS

This application is based on and claims priority to Japanese Patent Application No. 2018-242462, filed on Dec. 26, 2018, the content of which is incorporated herein by reference in its entirety.

FIELD OF THE INVENTION

The present invention relates to a method of detecting an origin point of a machine tool and a tool magazine.

BACKGROUND OF THE INVENTION

Conventionally, there is known a machine tool having a tool magazine for containing a plurality of tools, where the machine tool is provided with a function of automatically exchanging a tool attached to a main shaft (e.g., PTLs Japanese Unexamined Utility Model Application Publication No. H05-49307, Japanese Unexamined Utility Model Application Publication No. S63-154145, Japanese translation of PCT international application, and Japanese Unexamined Patent Application Publication No. 2003-334742).

SUMMARY OF THE INVENTION

One aspect of this disclosure provides a machine tool including: a tool magazine which comprises a rotary unit configured to hold a plurality of tools and rotatable around a predetermined rotary axis and a measured portion provided in the rotary unit; a sensor disposed outside of the rotary unit in a radial direction that is perpendicular to the rotary axis, and configured to detect the measured portion; and a controller configured to detect a position of an origin point of the rotary unit based on a result of the detection by the sensor.

DESCRIPTION OF EMBODIMENT(S) OF THE INVENTION

Hereinafter, a machine tool 1 according to one embodiment of the present invention will be described with reference to the drawings.

Figure 1:
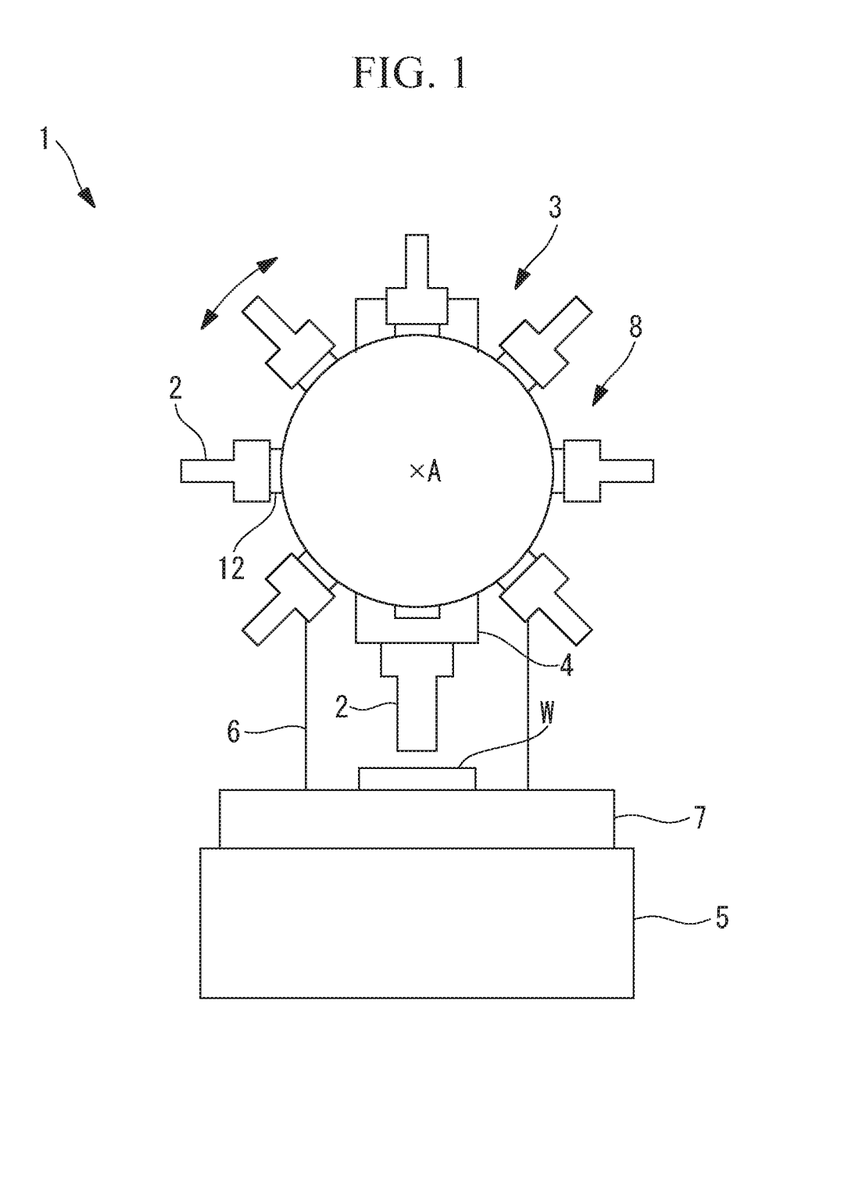
FIG. 1 is a schematic front view of a machine tool according to one embodiment of the present invention.
Figure 2:
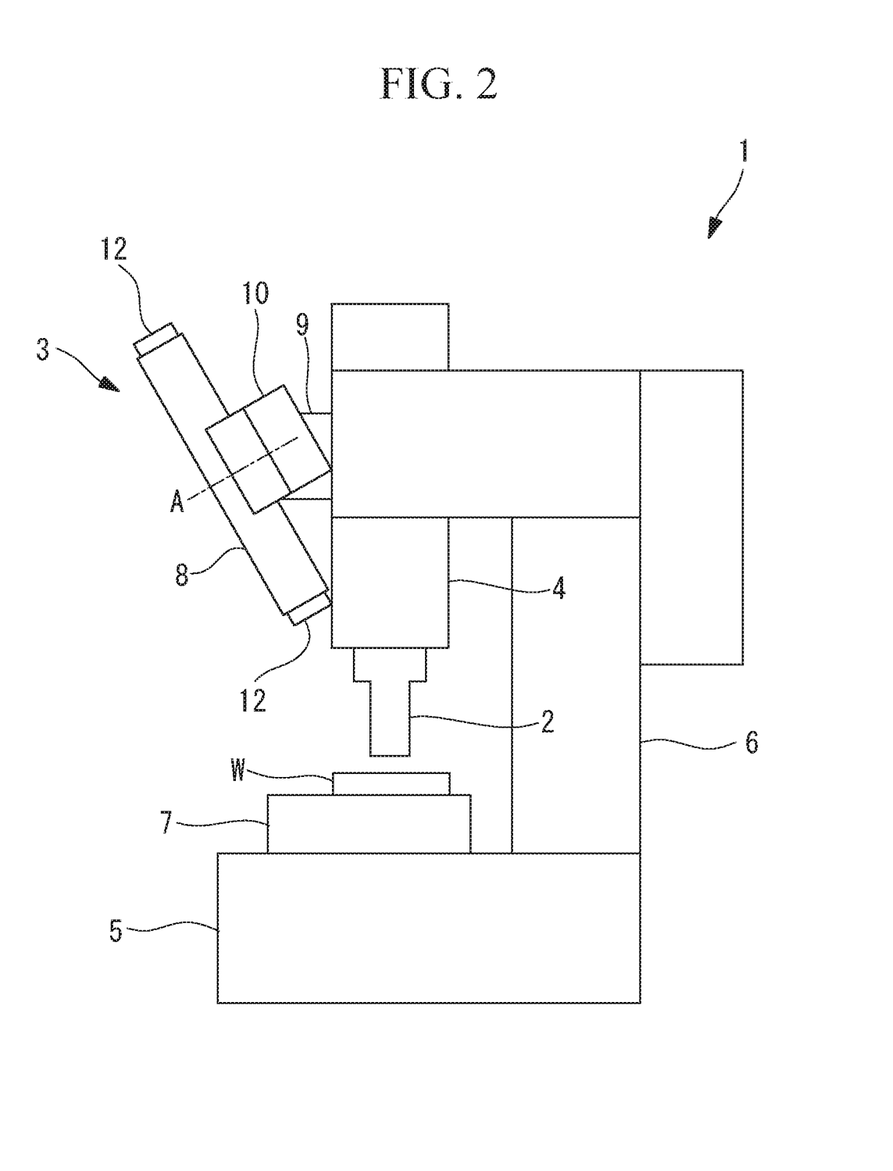
FIG. 2 is a schematic side view of the machine tool shown in FIG. 1.

As shown in FIG. 1 and FIG. 2, the machine tool 1 according to this embodiment includes a slewing-type tool magazine 3 that contains a plurality of tools 2, and a main shaft 4 that alternatively holds the plurality of tools 2 contained in the tool magazine 3. The main shaft 4 and the tool magazine 3 are fixed to a bed 5, and supported at a column 6 extending vertically upward from the bed 5. A work W is fixed to a table 7 placed on the bed 5.

The machine tool 1 moves the table 7 and the main shaft 4 relatively using a feed motor (not shown), while causing the main shaft 4 to rotate around a longitudinal axis of the main shaft 4 by a main shaft motor (not shown). This causes the work W and a rotating tool 2 to move relatively, and the work W is machined by the rotating tool 2.

The machine tool 1 also has a function of automatically exchanging the tool 2 between the tool magazine 3 and the main shaft 4.

The tool magazine 3 includes a rotary unit 8 that holds the plurality of tools 2 and rotates around a rotary axis A (cf., FIG. 3), a stationary unit 9 that is fixed to the column 6 and rotatably supports the rotary unit 8, and a rotary motor 10 that is provided in the rotary unit 8 and rotates the rotary unit 8. The rotary motor 10 is able to rotate the rotary unit 8 in both directions (a clockwise direction and a counterclockwise direction) around the rotary axis A.

Figure 3:
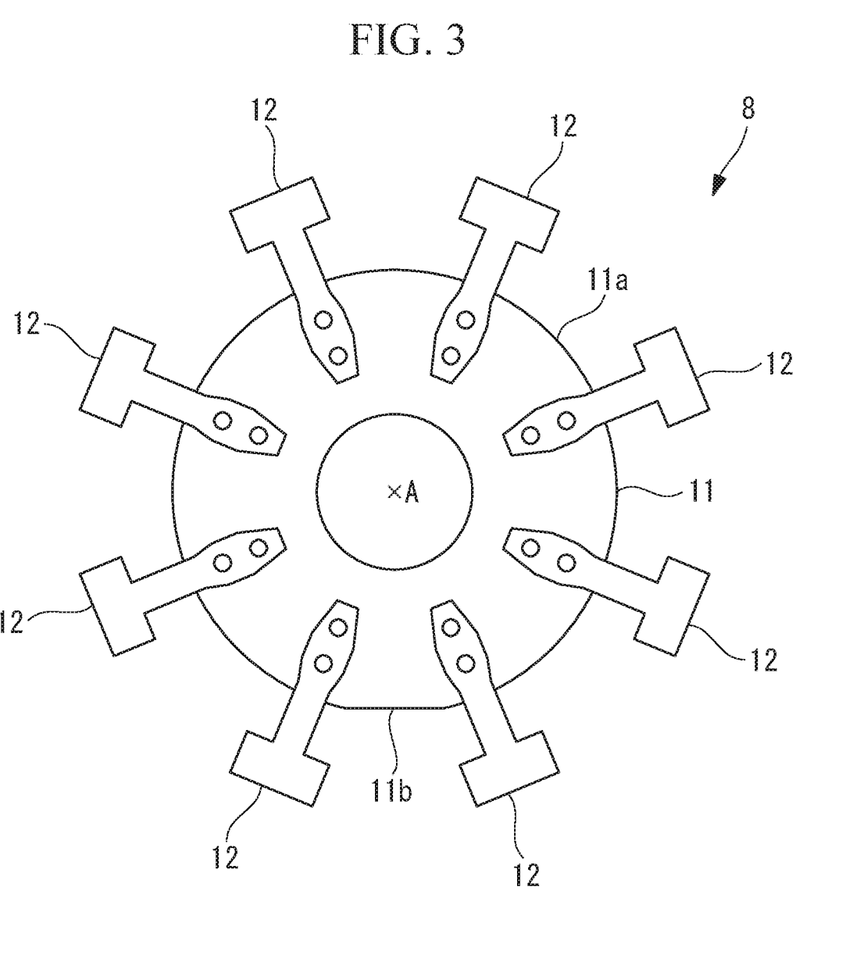
FIG. 3 is a schematic front view of a rotary unit of a tool magazine of the machine tool shown in FIG. 1.

As shown in FIG. 3, the rotary unit 8 includes a circular rotating plate 11 and a plurality of tool holding units 12 that are fixed to the rotating plate 11 and hold the tools 2 respectively. The rotary axis A extends in a direction intersecting with a vertical direction, and coincides with a central axis of the rotating plate 11. The plurality of tool holding units 12 are arranged in a circumferential direction around the rotary axis A. By rotating the rotary unit 8, the plurality of tool holding units 12 is alternatively positioned at a predetermined tool exchange position. The machine tool 1 exchanges the tool 2 held by the main shaft 4 by exchanging the tool 2 between the tool holding unit 12 and the main shaft 4 at the tool exchange position.

The rotating plate 11 includes an annular outer periphery surface that faces radially outward. The outer periphery surface is configured by a curved surface 11a having a constant curvature radius with the rotary axis A as a center of curvature, and a flat measurement surface (measured portion) 11b that is connected to both ends of the curved surface 11a. When the rotating plate 11 is seen from the front side in a direction along the rotary axis A, the measurement surface 11b is disposed along a chord of a circle centering on the rotary axis A, and a distance from the measurement surface 11b to the rotary axis A gradually changes in the circumferential direction around the rotary axis A.

Figure 4:
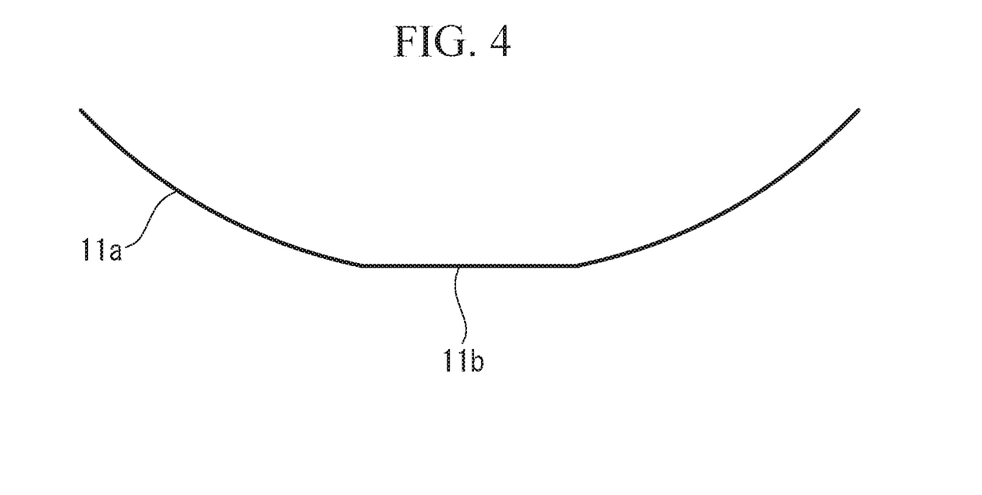
FIG. 4 is an enlarged view of a portion near a measurement surface of the rotary unit shown in FIG. 3.

When the rotary unit 8 is positioned at a position of an origin point, the measurement surface 11b is positioned along a predetermined direction on a predetermined side. The position of the origin point is a predetermined rotational position around the rotary axis A, and a rotational angle around the rotary axis A of the rotary unit 8 when the rotary unit 8 is positioned at the position of the origin point is defined to be 0 degrees. In this embodiment, as shown in FIG. 3 and FIG. 4, when the rotary unit 8 is positioned at the position of the origin point, the measurement surface 11b is placed horizontally on a lower side.

It should be noted that a position and an orientation of the measurement surface 11b when the rotary unit 8 is positioned at the position of the origin point may be altered as needed. For example, when the rotary unit 8 is positioned at the position of the origin point, the measurement surface 11b may be placed horizontally on an upper side, or may be placed vertically on either side in the horizontal direction.

Figure 5:
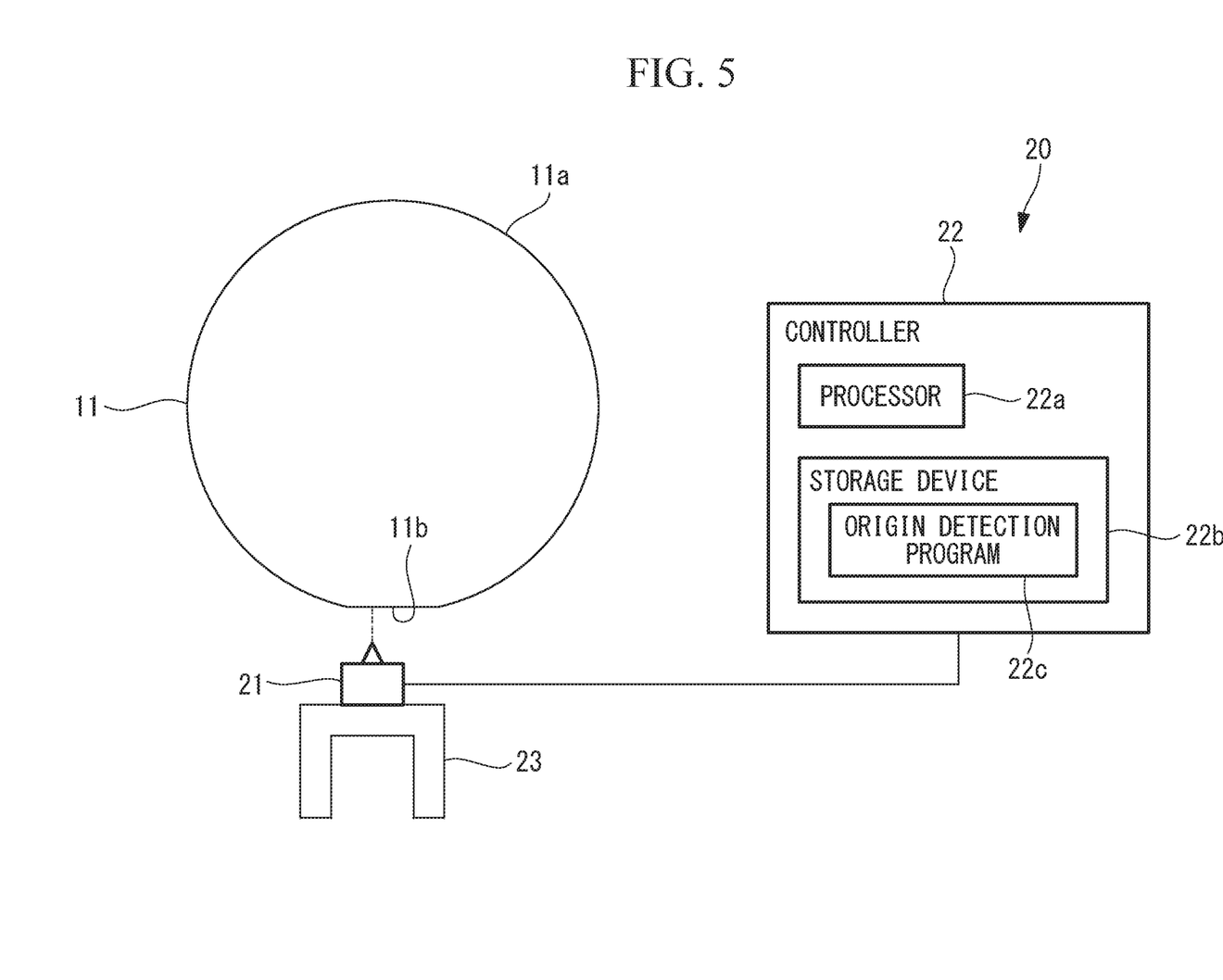
FIG. 5 is a configurational diagram of an origin detection device provided in the machine tool shown in FIG. 1.

Further, as shown in FIG. 5, the machine tool 1 includes an origin detection device 20 that detects the position of the origin point of the rotary unit 8. The origin detection device 20 includes a single sensor 21 that is placed radially outside of the rotary unit 8 and detects the measurement surface 11b, and a controller 22 that controls the rotary unit 8 and the sensor 21. The origin detection device 20 may always be provided in the machine tool 1, or may be attached to the machine tool 1 only during the origin detection operation for detecting the origin point of the rotary unit 8.

The sensor 21 is a distance sensor that measures a distance to the measurement surface 11b. One example of the distance sensor 21 is an optical distance sensor that calculates the distance based on time period from emitting a laser beam toward the measurement surface 11b until the laser beam returns after reflected on the measurement surface 11b. The distance sensor 21 of a different type may also be used. The distance sensor 21 is positioned at a position that faces the measurement surface 11b of the rotary unit 8 arranged at the position of the origin point, and fixed to a structural body that does not move during rotation of the rotary unit 8 by the rotary motor 10. Examples of the structural body include the stationary unit 9, the column 6, and a floor on which the machine tool 1 is placed.

The origin detection device 20 further includes a jig 23 that is removable from the tool magazine 3, and the distance sensor 21 may be attached by the jig 23 to the rotary unit 8 of the tool magazine 3 at a predetermined position with a predetermined orientation. As one example, the jig 23 is removably attached to a structural body placed under the rotary unit 8.

The distance measured by the distance sensor 21 changes according to of a rotational position of the rotary unit 8. Specifically, when the curved surface 11a faces the distance sensor 21, the measured distance becomes a predetermined constant value. When the measurement surface 11b faces the distance sensor 21, the measured distance becomes a value greater than the predetermined constant value, and sequentially changes according to the rotational position of the rotary unit 8. Further, the measured distance is maximized when the rotational position of the rotary unit 8 is at the position of the origin point. Thus, the distance sensor 21 is able to detect the measurement surface 11b based on the measured distance. Moreover, it is possible to identify the rotational position of the rotary unit 8 based on a distance to the measurement surface 11b measured by the distance sensor 21.

The controller 22 includes a processor 22a and a storage device 22b such as a RAM and a ROM. The storage device 22b stores an origin detection program 22c. The processor 22a of the controller 22 executes control and arithmetic processing of the rotary motor 10 and the distance sensor 21 according to the origin detection program 22c, and thereby performs the origin detection operation for the rotary unit 8. As on example, the origin detection operation is performed based on an instruction of an operator after exchange of the rotary motor 10 or after repair of the tool magazine 3.

It should be noted that the controller 22 of the origin detection device 20 may be a controller that controls the machine tool 1 as a whole (not shown), or may be provided separately from the controller of the machine tool 1.

Next, an origin detection operation (a method of detecting an origin point) for detecting an origin point of the tool magazine 3 carried out by the controller 22 will be described.

The controller 22 causes the distance sensor 21 to measure a distance while controlling the rotary motor 10 to rotate the rotary unit 8. The controller 22 controls a direction of the rotation of the rotary unit 8 according to a change over time in the distance measured by the distance sensor 21. Specifically, when the measured distance does not change over time, the controller 22 maintains the direction of the rotation of the rotary unit 8 in the clockwise direction. Further, when the measured distance increases over time, the controller 22 maintains the direction of the rotation of the rotary unit 8 in the clockwise direction. On the other hand, when the measured distance decreases over time, the controller 22 reverses the direction of the rotation of the rotary unit 8 to the counterclockwise direction. With this, the direction of the rotation of the rotary unit 8 is controlled in a direction in which the rotational position of the rotary unit 8 comes closer to the position of the origin point.

When the distance measured by the distance sensor 21 becomes equal to or greater than a predetermined threshold value (falls within a predetermined range), the controller 22 detects the rotational position of the rotary unit 8 at this time as the position of the origin point. The predetermined threshold value is a value slightly smaller than a value of the measured distance when the rotational position of the rotary unit 8 matches the position of the origin point, and set according to accuracy in detection required for the position of the origin point.

Then, the controller 22 returns the rotary unit 8 to the position of the origin point by stopping the rotary unit 8 at the detected position of the origin point.

In a state in which the rotary unit 8 is returned to the position of the origin point, the controller of the machine tool 1 stores a correspondence relationship between the rotational angle of the rotary unit 8 and a rotational angle of the rotary motor 10. The controller controls the rotational angle of the rotary unit 8 using the rotary motor 10 based on the stored correspondence relationship.

As described above, according to this embodiment, the position of the origin point of the rotary unit 8 is automatically detected based on the distance to the measurement surface 11b of the rotary unit 8 measured by the distance sensor 21, and the rotary unit 8 automatically returns to the position of the origin point. As described above, it is advantageously possible to automate the complicated origin detection operation for the rotary unit 8 that has conventionally depended on a manual operation by an operator.

Further, as the measurement surface 11b is flat, the measured distance gradually increases as the rotational position of the rotary unit 8 comes closer to the position of the origin point, and the measured distance is maximized when the rotational position of the rotary unit 8 matches the position of the origin point. Therefore, it is advantageously possible to detect the position of the origin point of the rotary unit 8 with high accuracy based on the distance measured by the distance sensor 21.

Moreover, the distance measured by the distance sensor 21 gradually changes during rotation of the rotary unit 8, and it is possible to determine whether the rotary unit 8 is rotating in a direction toward the position of the origin point or rotating in a direction away from the position of the origin point based on a change over time in the measured distance to the measurement surface 11b. Therefore, according to the change over time in the distance measured during rotation of the rotary unit 8, the controller 22 is able to control the direction of the rotation of the rotary unit 8 in the direction in which the rotary unit 8 comes closer to the position of the origin point, and to bring the rotational position of the rotary unit 8 to the position of the origin point quickly and reliably.

Figure 6:
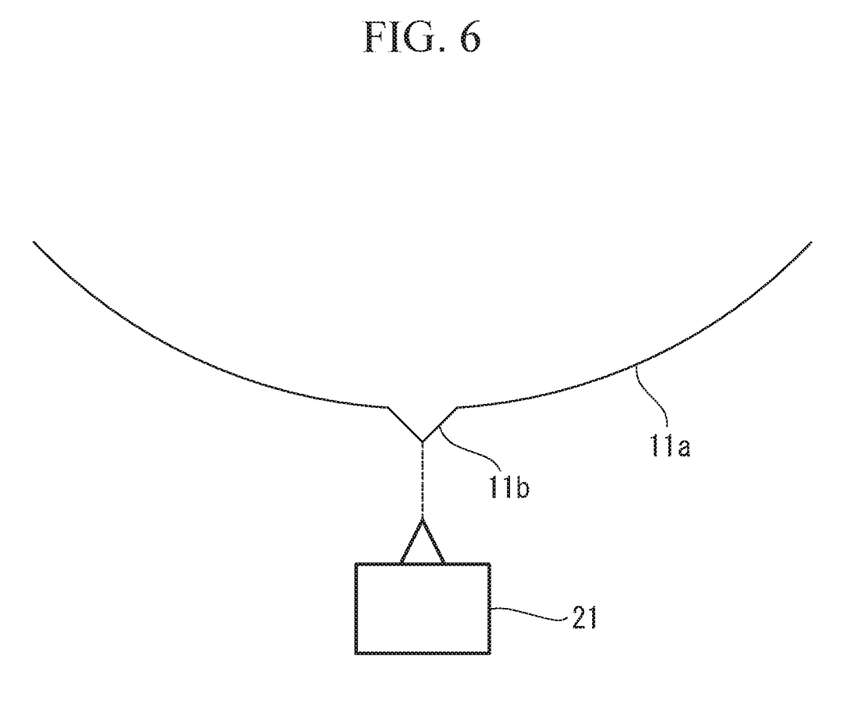
FIG. 6 is a partial front view of a rotating plate showing a modified example of the measurement surface.

According to the embodiment described above, the measurement surface 11*b* may have a shape in which the distance measured by the distance sensor 21 is minimized when the rotary unit 8 is positioned at the position of the origin point. As shown in FIG. 6, the measurement surface 11*b* may be a V shape extending radially outward, for example.

In this case, the distance measured by the distance sensor 21 gradually decreases as the rotational position of the rotary unit 8 comes closer to the position of the origin point, and is minimized when the rotational position of the rotary unit 8 matches the position of the origin point. Therefore, when the measured distance decreases over time, the controller 22 maintains the direction of the rotation of the rotary unit 8, and when the measured distance increases over time, the controller 22 reverses the rotational direction of the rotary unit 8. Then, when the distance measured by the distance sensor 21 becomes equal to or smaller than a predetermined threshold value (falls within a predetermined range), the controller 22 detects the rotational position of the rotary unit 8 at this time as the position of the origin point.

Figure 7:
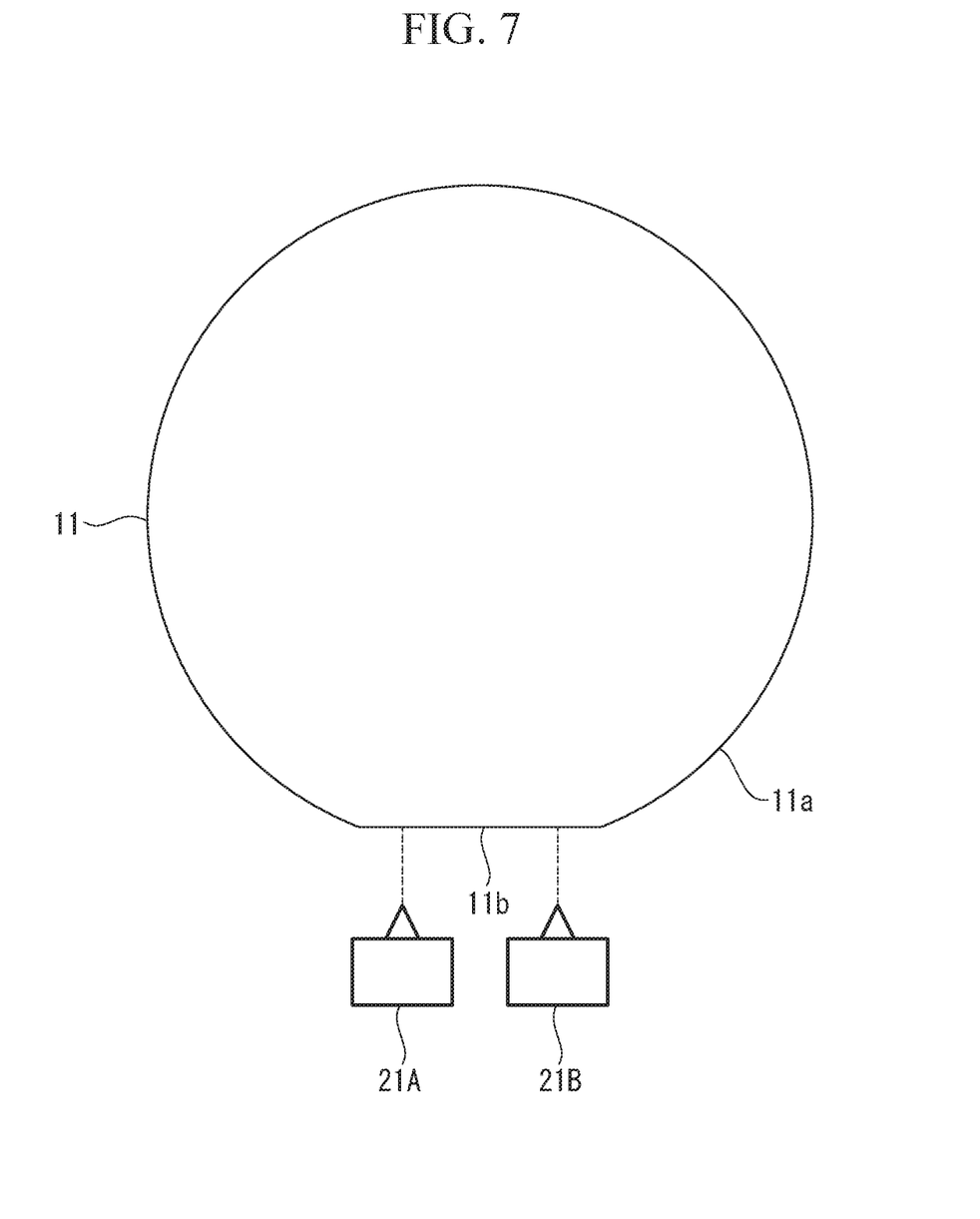
FIG. 7 is an illustrative view showing arrangement of distance sensors in a modified example of the origin detection device shown in FIG. 5.

In the embodiment described above, the origin detection device 20 includes only one distance sensor 21, but may be placed around the rotating plate 11 as shown in FIG. 7. FIG. 7 shows one example in which the two distance sensors 21A and 21B are provided. The two distance sensors 21A and 21B are positioned, with a space between the sensors, along a direction parallel to a radial direction orthogonal to the rotary axis A. The origin detection device 20 may include 3 or more distance sensors 21.

The two distance sensors 21A and 21B are disposed in the horizontal direction so as to be arranged along a direction parallel to the measurement surface 11*b* when the rotary unit 8 is positioned at the position of the origin point. Therefore, when the rotary unit 8 is positioned at the position of the origin point, distances measured by the two distance sensors 21A and 21B become equal.

The controller 22 detects, as the position of the origin point, the rotational position of the rotary unit 8 when both of the distances measured by the two distance sensors 21A and 21B are equal to or greater than a predetermined threshold value.

As described above, by using the distances measured by the two distance sensors 21A and 21B, it is possible to detect the position of the origin point of the rotary unit 8 with higher accuracy.

The controller 22 may detect, as the position of the origin point, the rotational position of the rotary unit 8 when the difference between the distances measured by the two distance sensors 21A and 21B is equal to or smaller than a predetermined value, preferably when the difference between the distances is zero (i.e., the distances measured by the two distance sensors 21A and 21B are equal).

This also allows the detection of the position of the origin point of the rotary unit 8 with higher accuracy.

Alternatively, the controller 22 may detect, as the position of the origin point, the rotational position of the rotary unit 8 when both of the distances measured by the two distance sensors 21A and 21B are equal to or greater than a predetermined threshold value, and when the difference between the distances measured by the two distance sensors 21A and 21B is equal to or smaller than a predetermined value.

By detecting the rotational position of the rotary unit 8 when the distances measured by the two distance sensors 21A and 21B satisfy the two conditions as the position of the origin point in this manner, it is possible to detect the position of the origin point with even higher accuracy.

In the modified example shown in FIG. 7, the controller 22 may detect the position of the origin point of the rotary unit 8 from the distances measured by the two distance sensors 21A and 21B.

The controller 22 calculates an inclination angle of the measurement surface 11*b* with respect to the horizontal direction based on the difference between the distances measured by the distance sensors 21A and 21B and a horizontal distance between the distance sensors 21A and 21B. A value of the distance between the distance sensors 21A and 21B is known, and previously stored in the storage device 22*b* of the controller 22. The inclination angle of the measurement surface 11*b* changes according to an offset angle between the rotational position of the rotary unit 8 and the position of the origin point. Therefore, the controller 22 is able to detect the position of the origin point of the rotary unit 8 from the calculated inclination angle. The controller 22 return the rotary unit 8 to the position of the origin point by calculating the offset angle of the rotary unit 8 from the position of the origin point, and by rotating the rotary unit 8 to the direction toward the position of the origin point by the calculated offset angle.

As described above, it is possible to detect the position of the origin point of the rotary unit 8 and to return the rotary unit 8 to the position of the origin point using only the two distances measured at one rotational position. Therefore, it is possible to detect the position of the origin point of the rotary unit 8 and return the rotary unit 8 to the position of the origin point in a simpler manner more quickly, as compared to a case in which distances are measured at a large number of rotational positions while the rotary unit 8 is rotated.

Figure 8:
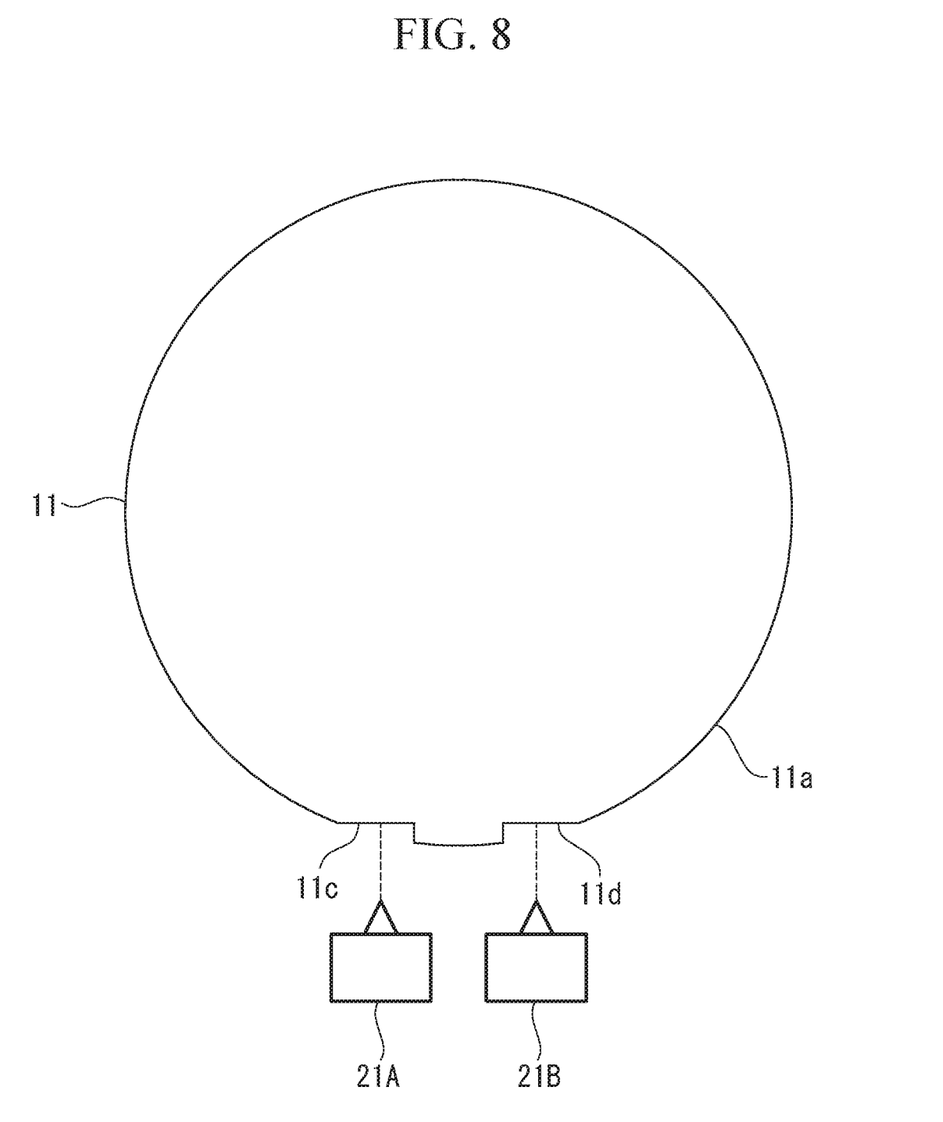
FIG. 8 is a front view of a rotating plate showing another modified example of the measurement surface.

When the origin detection device 20 includes the two distance sensors 21A and 21B, measurement surfaces 11*c* and 11*d* may be provided, as shown in FIG. 8, at two positions along a circumferential direction of the rotary unit 8.

Similarly to the measurement surface 11*b*, the measurement surfaces 11*c* and 11*d* are flat surfaces that are arranged in the horizontal direction when the rotary unit 8 is positioned at the position of the origin point. The two distance sensors 21A and 21B are positioned with respect to the rotary unit 8, such that the distance sensor 21A faces the one measurement surface 11*c*, and the other distance sensor 21B faces the other measurement surface 11*d* when the rotary unit 8 is positioned at the position of the origin point.

Vertical heights of the two measurement surfaces 11*c* and 11*d* when the rotary unit 8 is positioned at the position of the origin point may be the same with or different from each other.

If the vertical heights of the two measurement surfaces 11*c* and 11*d* are the same with each other, the controller 22 is able to detect the rotational position of the rotary unit 8 as the position of the origin point when the distances measured by the two distance sensors 21A and 21B are respectively equal to or greater than predetermined threshold values, and/or when the difference between the distances measured by the two distance sensor 21 is equal to or smaller than a predetermined value.

On the other hand, if the vertical heights of the two measurement surfaces 11*c* and 11*d* are different from each other, the controller 22 is able to detect the rotational position of the rotary unit 8 as the position of the origin point when the distances measured by the two distance sensors 21A and 21B are respectively equal to or greater than the predetermined threshold values. Here, the predetermined threshold value for the distance measured by the one distance sensor 21A and the predetermined threshold value for the distance measured by the other distance sensor 21B are different from each other.

In the embodiment described above, the measurement surface 11b is provided on the rotating plate 11. However, instead, the measurement surface 11b may be provided in a different member that constitutes the rotary unit 8. For example, the measurement surface 11b may be provided in one of the tool holding units 12, or may be provided in any member fixed to the rotating plate 11. Further, the position of the distance sensor 21 may be changed according to the position of the measurement surface 11b.

In the embodiment described above, the measured portion is the measurement surface 11b provided in the rotary unit 8, and the sensor is the distance sensor 21 that measures the distance to the measurement surface 11b. However, specific configurations of the measured portion and the sensor are not limited to the above example.

For example, the measured portion may be a marker provided in the rotary unit 8, and the sensor may be a proximity sensor that detect the marker. This marker is fixed to the rotary unit 8 at a position radially spaced apart from the rotary axis A. Therefore, the position of the marker along the circumferential direction around the rotary axis A changes according to the rotational position of the rotary unit 8. The proximity sensor is configured to detect the marker closest to the proximity sensor when the rotary unit 8 is positioned at a predetermined rotational position (e.g., the position of the origin point). A relationship between the predetermined rotational position and the position of the origin point is known. The controller 22 is able to detect the position of the origin point based on the rotational position of the rotary unit 8 when the marker is detected by the proximity sensor.

The invention claimed is:

1. A machine tool comprising:
a tool magazine comprising a rotary unit and a measured portion, wherein the rotary unit comprises a plate that rotates around a rotary axis, wherein the plate comprises an outer peripheral surface, wherein the outer peripheral surface comprises a curved surface and a chord of a circle centered on the rotary axis, wherein the chord comprises a flat surface, and wherein the rotary unit is configured to hold a plurality of tools;
a sensor disposed outside of the rotary unit in a radial direction that is perpendicular to the rotary axis, and configured to detect the measured portion; and
a controller configured to detect a position of an origin point of the rotary unit based on a result of the detection by the sensor,
wherein the measured portion is disposed along the chord and contains the origin point.

2. The machine tool according to claim 1, wherein
the measured portion is a measurement surface that faces outward in the radial direction with respect to the rotary axis, the measurement surface has a shape whose distance to the predetermined rotary axis gradually changes along a circumferential direction around the predetermined rotary axis, and
the sensor is a distance sensor configured to measure a measured distance to the measurement surface.

3. The machine tool according to claim 2, wherein the controller causes the distance sensor to measure the measured distance while rotating the rotary unit,
wherein the controller causes the distance sensor to detect a rotational position of the rotary unit around the rotary axis, and
wherein the measured distance falls within a predetermined range at the rotational position.

4. The machine tool according to claim 3, wherein the controller is configured to control a rotational direction of the rotary unit in response to the measured distance.

5. The machine tool according to claim 4, wherein
the measurement surface has a shape in which the measured distance is maximized when the rotary unit is positioned at the position of the origin point, and
the controller is configured to:
maintain the rotational direction of the rotary unit when the measured distance increases over time, and
reverse the rotational direction of the rotary unit when the measured distance decreases over time.

6. A machine tool, comprising:
a tool magazine comprising a rotary unit and a measured portion, wherein the rotary unit is configured to hold a plurality of tools and wherein the rotary unit is rotatable around a predetermined rotary axis;
a sensor disposed outside of the rotary unit in a radial direction that is perpendicular to the rotary axis, and configured to detect the measured portion;
a controller configured to detect a position of the rotary unit based on a result of the detection by the sensor; and
a jig removable from the tool magazine,
wherein the sensor is attached by the jig to the tool magazine at a predetermined position with a predetermined orientation.

7. A machine tool comprising:
a tool magazine comprising a rotary unit and a measured portion, wherein the rotary unit is configured to hold a plurality of tools and wherein the rotary unit is rotatable around a predetermined rotary axis;
a sensor disposed outside of the rotary unit in a radial direction that is perpendicular to the rotary axis, and configured to detect the measured portion; and
a controller configured to detect a position of an origin point of the rotary unit based on a result of the detection by the sensor,
wherein the measured portion is disposed along a chord of a circle centered on the rotary axis,
wherein the measured portion is a measurement surface that faces outward in the radial direction with respect to the rotary axis, the measurement surface has a shape whose distance to the predetermined rotary axis gradually changes along a circumferential direction around the predetermined rotary axis,
wherein the sensor is a distance sensor configured to measure a measured distance to the measurement surface,
wherein the controller causes the distance sensor to measure the measured distance while rotating the rotary unit,
wherein the controller causes the distance sensor to detect a rotational position of the rotary unit around the rotary axis,
wherein the measured distance falls within a predetermined range at the rotational position,
wherein the controller is configured to control a rotational direction of the rotary unit in response to the measured distance,
wherein the measurement surface has a shape in which the measured distance is maximized when the rotary unit is positioned at the position of the origin point, and wherein the controller is configured to:
maintain the rotational direction of the rotary unit when the measured distance increases over time, and
reverse the rotational direction of the rotary unit when the measured distance decreases over time.

\* \* \* \* \*